United States Patent [19]

Smith

[11] Patent Number: 4,926,563

[45] Date of Patent: May 22, 1990

[54] THEODOLITE TARGET ADAPTOR AND METHOD OF USE

[75] Inventor: Robert L. Smith, Mt. Juliet, Tenn.

[73] Assignee: Northrop Corporation, Los Angeles, Calif.

[21] Appl. No.: 419,228

[22] Filed: Oct. 10, 1989

[51] Int. Cl.$^5$ .............................................. G01C 1/02
[52] U.S. Cl. ......................................... 33/293; 33/286
[58] Field of Search ........................ 33/293, 299, 297

[56] References Cited

U.S. PATENT DOCUMENTS

| | | | |
|---|---|---|---|
| 4,084,327 | 4/1978 | Kooi | 33/299 |
| 4,202,110 | 5/1980 | Kooi | 33/299 |
| 4,455,758 | 6/1987 | Iwafune et al. | 33/299 |
| 4,549,360 | 10/1985 | Allen | 33/293 |
| 4,656,878 | 4/1987 | Iwai et al. | 33/299 |
| 4,681,439 | 7/1987 | Shoemaker | 33/293 |

*Primary Examiner*—William A. Cuchlinski, Jr.
*Assistant Examiner*—William C. Dowling
*Attorney, Agent, or Firm*—Terry J. Anderson; Robert B. Block

[57] ABSTRACT

An improved adaptor capable of coupling a theodolite target with respect to an aperture extending through tooling, the adaptor comprising a cylindrical disk having an exterior surface of a size to be received within the aperture of the tooling, the disk having an interior surface formed as an opening to define a space in which a theodolite target is to be received, the disk having a hole in the interior surface extending radially with respect to the axis of the disk, the hole being of a size to receive the cylindrical base of the theodolite target to be received, a threaded aperture extending through the disk into the hole, and a set screw mounted in the threaded aperture for fixedly securing the theodolite target in position in the disk for viewing from either or both sides of the tooling. Also disclosed is the method of using such an adaptor.

8 Claims, 1 Drawing Sheet

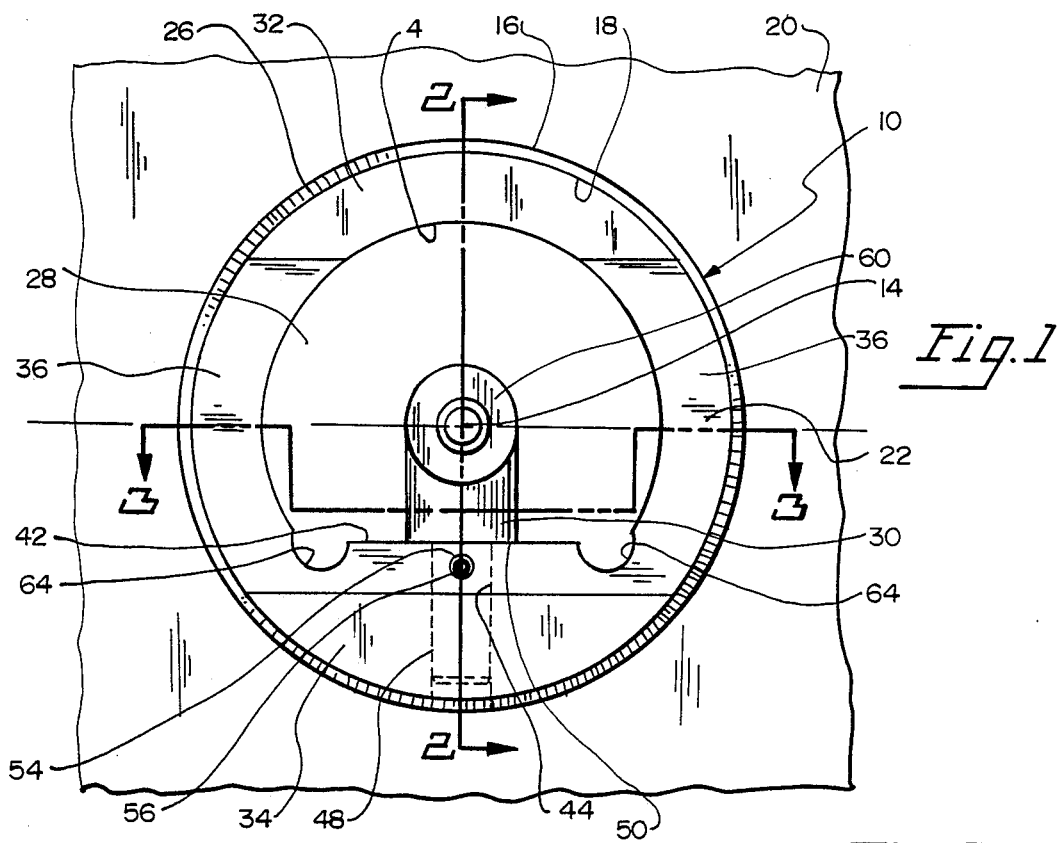
Fig.1
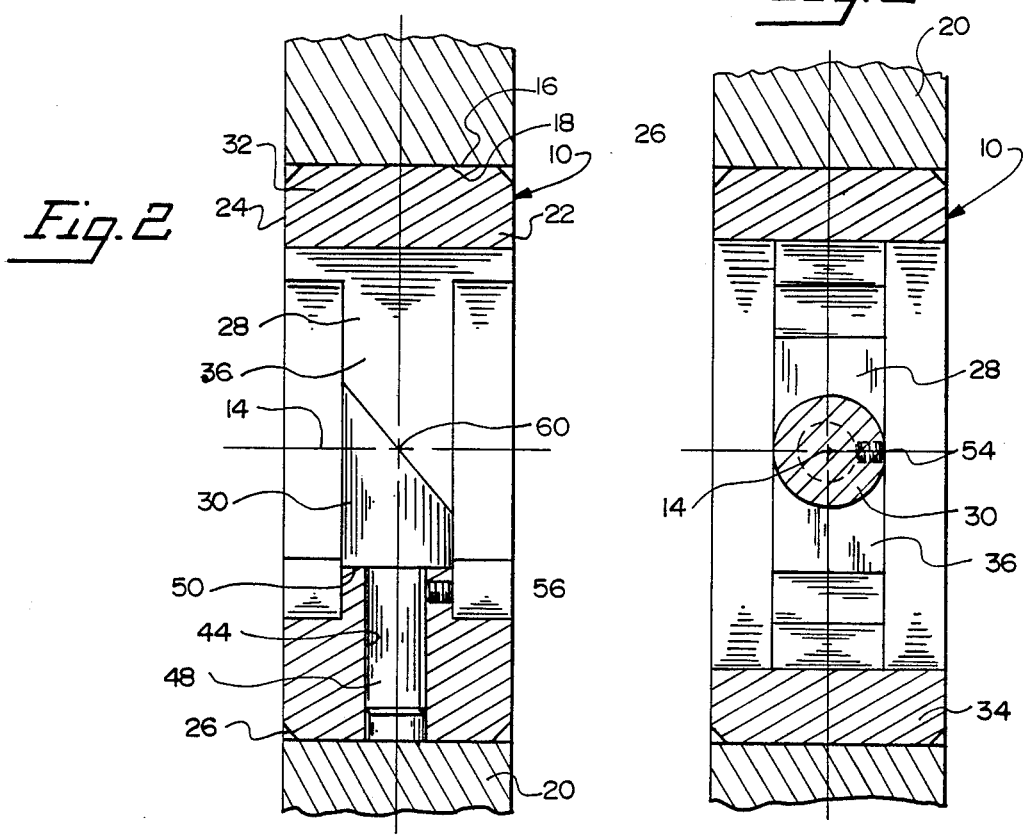
Fig.2
Fig.3

THEODOLITE TARGET ADAPTOR AND METHOD OF USE

BACKGROUND OF THE INVENTION

This invention relates to a theodolite target adaptor and, more particularly, to a method and apparatus including a disk-like member positionable in a hole of tooling and adapted to support a theodolite target in a position for sighting by instruments on either side of the tooling.

DESCRIPTION OF THE BACKGROUND ART

A jig and a fixture are types of tooling devices used to position and hold workpieces during machining operations such as drilling, cutting or the like and to guide a tool for such machining operations. Tooling may also be used to position a plurality of parts to create an assembly. Such tooling is provided with critically located part index holes and with abutment surfaces in order to effect the proper positioning of such workpieces or parts. If the holes and abutment surfaces of the tooling are not located properly, the workpieces produced or parts assembled with such tooling will not meet their engineering design requirements.

The process of providing holes, abutment surfaces, etc. in proper, precise locations on tooling is normally effected through a reference system such as a tool and ball system or a line-of-sight system. In each of these reference systems, a target is positioned on the tooling and instruments are used to determine proper, precise locations with respect to such targets and instruments. Advanced computer-aided systems, such as photogrammetry or compute-raided theodolites (CAT), may be utilized in either of the above-referred to reference systems.

The adapter of the instant invention was developed so as to allow the utilization of a typical tooling line-of-sight reference system with a computer aided theodolite (CAT) system. CAT is a portable optical coordinate measurement system that, in association with a target or targets, employs a computer to calculate the vertical and horizontal angular deviations between two or more associated instruments. Due to the necessity to position the instruments to provide the most optimum apex between instrument sight paths, the need for an improved target was paramount to recover visibility to an otherwise lost line-of-sight reference system.

Line-of-sight locations are often designed into header boards and other plate steel details of tooling. The target design of the present invention would, for the first time, allow target visibility from instrument locations on both sides of the header board. Another notable application would apply to the use of a conventional line of scope. Presently, teflon or glass targets are placed in the line-of-sight hole and removed to provide visibility to a target beyond, i.e, a location farther away from scope. With the target of the instant invention, the standard theodolite target can be removed much easier and with less chance of disturbing a set-up.

Another benefit of the present invention is the durability and maintenance of the proposed target adaptor. With the proposed high carbon, tool steel material, the wear life under normal usage is virtually lifetime. Material stability allows the fixed accuracy of the target's critical features to last indefinitely. The target is also removable from the adaptor thus allowing easy replacement and interchangeability with other types of standard theodolite targets.

Various approaches are disclosed in the patent literature for determining locations or for the positioning of one part with respect to another. Note, for example, U.S. Pat. No. 4,549,360 issued to Allen which describes a relatively modern optical line-of-sight reference system. More traditional reference systems for surveyors are disclosed in U.S. Pat. Nos. 2,088,394 issued to Wright and 3,271,865 issued to Glidden et al. A large number of additional, more modern, reference systems, particularly adapted for pipe laying, are disclosed in U.S. Pat. Nos. 3,599,336 issued to Walsh; 3,634,941 issued to Roodvoets et al; 3,898,743 issued to Myeress and 4,681,439 to Shoemaker. In addition, reference systems are disclosed in a wide variety of other applications such as in aviation for compass swinging, helicopter rotary blade phasing as exemplified by U.S. Pat. No. 2,748,486 issued to Lord et al and 4,422,757 issued to Munski, and lumber cutting measurement exemplified in U.S. Pat. No. 4,085,512 issued to Bod.

As illustrated by the great number of prior patents and commercial devices and techniques, efforts are continuously being made in an attempt to improve apparatus and methods for determining locations and for positioning one component with respect to another. Such efforts are being made to render such processes more efficient, reliable, inexpensive and convenient to use. None of these previous efforts, however, provides the benefits attendant with the present invention. Additionally, the prior patents and commercial devices and techniques do not suggest the present inventive combination of method steps and component elements arranged and configured as disclosed and claimed herein. The present invention achieves its intended purposes, objects and advantages through a new, useful and unobvious combination of method steps and component elements, with the use of a minimum number of functioning parts, at a reasonable or lower cost to manufacture, and by employing only readily available materials.

Therefore, it is an object of this invention to provide an improved adaptor capable of coupling a theodolite target with respect to an aperture extending through tooling, the adaptor comprising a cylindrical disk having an exterior surface of a size to be received within the aperture of the tooling, the disk having an interior surface formed as an opening to define a space in which a theodolite target is to be received, the disk having a hole in the interior surface extending radially with respect to the axis of the disk, the hole being of a size to receive the cylindrical base of the theodolite target to be received, a threaded aperture extending through the disk into the hole, and a set screw mounted in the threaded aperture for fixedly securing the theodolite target in position in the disk for viewing from either or both sides of the tooling.

It is a further other object of this invention to provide an improved method of utilizing theodolite targets visible from both sides of tooling.

Lastly, it is an object of the present invention to sight theodolite targets more efficiently, reliably, conveniently and economically.

The foregoing has outlined some of the more pertinent objects of the invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with the specific embodiment shown in the attached drawings. For the purpose of summarizing the invention, the invention may be incorporated into an improved adaptor capable of coupling a theodolite target with respect to an aperture extending through tooling, the adaptor comprising a cylindrical disk having an exterior surface of a size to be received within the aperture of the tooling, the disk having an interior surface formed as an opening to define a space in which a theodolite target is to be received, the disk having a hole in the interior surface extending radially with respect to the axis of the disk, the hole being of a size to receive the cylindrical base of the theodolite target to be received, a threaded aperture extending through the disk into the hole, and a set screw mounted in the threaded aperture for fixedly securing the theodolite target in position in the disk for viewing from either or both sides of the tooling. The aperture of the tooling and the exterior surface of the disk are circular and of an essentially common diameter. The disk is of a thickness essentially equal to the thickness of the tooling at its upper and lower portions and thinner at its sides. The adaptor further includes a pair of semi-circular slots formed in the interior surface of the disk, parallel with the axis of the disk, and with chamfered edges on the exterior surface.

The invention may also be incorporated into improved apparatus adapted to couple a theodolite target with an aperture of tooling comprising (1) a cylindrical disk-like member having a circular exterior surface adapted to be received and supported in a circular aperture of the tooling, the exterior surface having chamfered edges to facilitate the insertion and removal of the disk-like member with respect to the aperture, the disk-like member having an interior surface formed to define a space in which a theodolite target is to be received and supported, the disk-like member having a thickness at its upper and its lower portions essentially the same as the aperture in which it is to be received and with a lesser thickness at the sides between the upper and lower portions, the disk-like member having a flat surface on the lower portion of the interior surface with a hole extending therein radially with respect to the axis of the disk-like member, the hole being of a size to receive the cylindrical base of the theodolite target to be received and supported, and with a threaded aperture extending through the disk-like member into the hole; (2) a set screw mounted in the threaded aperture for fixedly securing the theodolite target in position in the disk-like member and with respect to the tooling; and (3) a pair of essentially semi-circular slots formed in the lower portion on opposite sides of the hole and parallel with the axis adapted to receive a fixture for the insertion of the disk-like member into the tooling in which it is to be received and for its removal therefrom.

Lastly, the invention may be incorporated into an improved method of establishing a reference system in tooling comprising providing tooling; forming a circular aperture through the tooling; positioning a disk-like adaptor with a circular exterior surface into the aperture; and positioning a theodolite target in an opening extending through the adaptor whereby instruments may sight the target from either side of the tooling.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific embodiment may be readily utilized as a basis for modifying or designing other methods and structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in conjunction with the accompanying drawings in which:

FIG. 1 is a plan view partly in section of the theodolite target adaptor constructed in accordance with the principles of the present invention, and also showing the target and tooling in which it is to be received.

FIGS. 2 and 3 are sectional views of the apparatus shown in FIG. 1 taken along lines 2—2 and 3—3 respectively.

Similar referenced characters refer to similar parts throughout the several Figures.

DETAILED DESCRIPTION OF THE INVENTION

With particular reference to the figures, there is shown in FIG. 1 a theodolite target adaptor 10 constructed in accordance with the principles of the present invention. The adaptor is of a generally disk-like configuration, formed generally as a cylindrical disk with a central axis 14.

The exterior surface 16 of the adaptor 10 is circular and is adapted to be press-fit into a mating circular aperture 18 in the tooling 20 in which it is to be received and utilized. The front and rear faces 22 and 24 of the adaptor have chamfers 26 adjacent the exterior surfaces to assist in their insertion into the aperture 18 of the tooling 20. The adaptor 10 is provided with a central opening 28 in the center of which the theodolite target 30 is to be positioned for operation and use.

The upper segment 32 and lower segment 34 of the adaptor 10 are of an enlarged thickness, essentially equal to the thickness of the tooling 20 in which it is to be received. The left and right sides 36 of the adaptor couple the upper and lower segments 32 and 34 are of a reduced thickness. The upper region 46 of the interior opening 28 is of an extended semi-circular configuration while the lower region 42 is essentially flat. The flat portion 42 of the interior opening is provided with a hole 44 extending radially with respect to the axis 14 of the adaptor 10. The diameter of the hole is of such a size as to receive the lower cylindrical portion 48 of the theodolite target 30 with the circular horizontal shoulder 50 resting on the flat portion 48. Located parallel with the axis 14 of the adaptor 10 is a threaded aperture 54 extending through a portion of the lower segment 34 of the adaptor 10 into the hole 44. The threaded aperture 54 is adapted to receive a set-screw 56 so as to securely position the theodolite target 30 in location during operation and use with its sighting face 60 in a proper, pre-determined accurate position.

Also located within the opening are a pair of semi-circular slots 64 with axes parallel to each other and parallel with the axis 14 of the adaptor 10. These semi-circular slots 64 are in the thinner, lower portion of the adaptor 10 and are positioned for being employed by a device, not shown, for the inserting of the adaptor 10 into an aperture 18 of the tooling 20 and for its removal therefrom.

The method of operation and use of the present invention includes of establishing a reference system in tooling comprising first providing the tooling and then forming a circular aperture through the tooling. Thereafter, the above-described adaptor is provided with a circular exterior surface positioned into the aperture and an interior surface with a hole for supporting a target. The theodolite target is placed in the opening which extends through the adaptor. As a result, instruments may sight the target from either or both sides of the tooling.

The subject target adaptor and method arose from the realization that the time frame for tooling set up and validation could not be appreciably reduced with conventional techniques. Numerous set-ups were required just to obtain visibility of the standard targets from the theodolite optical instruments.

Standard line of-sight targets consist of a flat disk made of teflon or glass with a 2.250 inch diameter and about ¼ inch to ⅜ inch thick. The target dot is machined on one side only. The type of target is virtually restricted for use with line-of-sight telescope. It is not practical to use with the new state-of-the-art 3D theodolite and photogrammetry systems. The standard line-of-sight reference system used on this particular validation was not effective. The target locations were frequently in solid plate steel tooling-type doors. These tooling doors were spaced approximately six (6) feet apart. If the standard line-of-sight targets were used, it would necessitate setting two of our instruments on the same side of the door. Using the theodolite line-of-sight target adaptor of the present invention, access is allowed to the target center from either side of the tooling door in which it is received and supported.

In addition to these reasons, the theodolite line-of-sight target adaptor is an excellent substitution in every application of the standard line-of-sight target. The instant adaptor is designed in such a way as to accept the new photogrammetry targets with no modifications. This will permit using the existing reference systems on all our tools with the new inspection systems.

Although particularly designed for use with line-of-sight reference systems using computer-aided theodolite instruments, it should be understood that the present invention is equally adaptable to tool and ball reference systems or other reference systems. The invention may, in like fashion be used with photogrammetry as well as with computer-aided theodolite systems.

The present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Now that the invention has been described, what is claimed is:

1. An adaptor capable of coupling a theodolite target with respect to an aperture extending through tooling, the adaptor comprising a cylindrical disk having an exterior surface of a size to be received within the aperture of the tooling, the disk having an interior surface formed as an opening to define a space in which a theodolite target is to be received, the disk having a hole in the interior surface extending radially with respect to the axis of the disk, the hole being of a size to receive the cylindrical base of the theodolite target to be received, a threaded aperture extending through the disk into the hole, and a set screw mounted in the threaded aperture for fixedly securing the theodolite target in position in the disk for viewing from either or both sides of the tooling.

2. The adaptor as set forth in claim 1 wherein the aperture of the tooling and the exterior surface of the disk are circular and of an essentially common diameter.

3. The adaptor as set forth in claim 2 wherein the disk is of a thickness essentially equal to the thickness of the tooling at its upper and lower portions.

4. The adaptor as set forth in claim 3 wherein the thickness of the disk is thinner at its sides.

5. The adaptor as set forth in claim 4 and further including a pair of semi-circular slots formed in the interior surface of the disk parallel with the axis of the disk.

6. The adaptor as set forth in claim 5 and further including chamfered edges on the exterior surface.

7. Apparatus adapted to couple a theodolite target with an aperture of tooling comprising:
   a cylindrical disk-like member having a circular exterior surface adapted to be received and supported in a circular aperture of the tooling, the exterior surface having chamfered edges to facilitate the insertion and removal of the disk-like member with respect to the aperture, the disk-like member having an interior surface formed to define a space in which a theodolite target is to be received and supported, the disk-like member having a thickness at its upper and its lower portions essentially the same as the aperture in which it is to be received and with a lesser thickness at the sides between the upper and lower portions, the disk-like member having a flat surface on the lower portion of the interior surface with a hole extending therein radially with respect to the axis of the disk-like member, the hole being of a size to receive the cylindrical base of the theodolite target to be received and supported, and with a threaded aperture extending through the disk-like member into the hole;
   a set screw mounted in the threaded aperture for fixedly securing the theodolite target in position in the disk-like member and with respect to the tooling; and
   a pair of essentially semi-circular slots formed in the lower portion on opposite sides of the hole and parallel with the axis adapted to receive a fixture for the insertion of the disk-like member into the tooling in which it is to be received and for its removal therefrom.

8. A method of establishing a reference system in tooling comprising:

providing tooling;

forming a circular aperture through the tooling;

positioning a disk-like adaptor with a circular exterior surface into the aperture; and positioning a theodolite target in an opening extending through the adaptor whereby instruments may sight the target from either side of the tooling.

* * * * *